United States Patent [19]

Jungwirth

[11] Patent Number: 5,090,812
[45] Date of Patent: Feb. 25, 1992

[54] RING LASER CAVITY BACKSCATTER MEASUREMENT

[75] Inventor: Douglas R. Jungwirth, Reseda, Calif.

[73] Assignee: Northrop Corporation, Los Angeles, Calif.

[21] Appl. No.: 648,665

[22] Filed: Jan. 31, 1991

[51] Int. Cl.⁵ ............................................. G01N 21/47
[52] U.S. Cl. .................................. 356/446; 356/445; 372/94
[58] Field of Search ............... 356/350, 124, 371, 446, 356/445; 372/94

[56] References Cited

U.S. PATENT DOCUMENTS

| | | | |
|---|---|---|---|
| 4,156,571 | 5/1979 | Ljung | 356/445 |
| 4,592,656 | 6/1986 | Egli | 356/350 |
| 4,844,615 | 7/1989 | Benoist | 356/350 |

Primary Examiner—Samuel Turner
Assistant Examiner—Richard E. Kurtz, II
Attorney, Agent, or Firm—Terry J. Anderson; Robert B. Block

[57] ABSTRACT

Method and apparatus for determining a backscatter radiation component of a ring laser. Electro-optic apparatus provides to a ring laser resonant cavity, during a first interval of time, a clockwise propagating radiation beam and also provides, during a second interval of time, a counter-clockwise propagating radiation beam. Other electro-optic apparatus measures, during the first interval of time, a magnitude of a backscatter radiation component resulting from the clockwise propagating radiation beam and also measures, during the second interval of time, a magnitude of a backscatter radiation component resulting from the counter-clockwise propagating radiation beam. The measured backscatter magnitudes are input to a processor for calculating a lock-in characteristic of the ring laser. The measured backscatter magnitudes are also optionally input to a display device for displaying, in conjunction with signals expressive of the clockwise and counter-clockwise propagating beams, a relationship between a beam and its resulting backscatter component.

19 Claims, 2 Drawing Sheets

RING LASER CAVITY BACKSCATTER MEASUREMENT

FIELD OF THE INVENTION

This invention relates generally to ring lasers and, in particular, to method and apparatus for predicting the lock-in characteristics of a ring laser gyroscope by directly measuring and quantifying the magnitude of optical backscatter within the laser cavity.

BACKGROUND OF THE INVENTION

A Ring Laser Gyroscope (RLG) is a rotation sensor that utilizes a beat frequency between two counter-propagating laser beams circulating within a closed laser cavity. The cavity may have a triangular geometry having mirrors at the apexes for reflecting the counter-propagating beams. RLGs are very accurate at medium and high angular rates but become non- linear and eventually insensitive at very low rates. This phenomenon is referred to as mode locking or frequency lock-in and gives an erroneous indication that the RLG is not rotating when in fact it is. The lock-in phenomenon is due to a coupling effect that becomes apparent when two harmonic oscillators resonate at substantially the same frequency. The coupling that occurs in RLGs is primarily due to a small amount of scattering, commonly referred to as backscatter, that occurs at each of the mirror surfaces in the direction of the counter-propagating beams. The amount of backscatter is thus directly related to mirror quality and directly influences the lock-in characteristics of the RLG. Unfortunately, using conventional techniques the mirror quality, and hence the magnitude of the backscatter, is not determined until after a pump and fill process that provides the RLG cavity with a lasant gas.

In U.S. Pat. No. 4,844,615, July 4, 1989, Benoist discloses a lock-in error correction technique that employ a pair of heterodyne detectors to produce heterodyne signals indicative of an interference pattern between the counter-propagating beams. The heterodyne signal is demodulated with a signal indicating the sum of the separate beam intensities to determine the magnitude of coupling between the beams in the RLG.

In U.S. Pat. No. 4,592,656, June 3, 1986, Egli uses a signal generator to modulate the positions of mirrors to phase modulate the backscattered waves an integer multiple of two pi radians.

In general, these patents teach the derivation of RLG lock-in information from the performance characteristics of an operating RLG. What is not taught, and what is thus one object of the invention, is a measurement of backscatter coefficients using a passive RLG cavity.

It is further object of the invention to provide method and apparatus that permits laser cavity mirror quality to be tested prior to the pump and fill process.

It is another object of the invention to directly measure and quantify the magnitude of the backscatter within an RLG cavity to predict the lock-in characteristics of the RLG.

SUMMARY OF THE INVENTION

The foregoing problems are overcome and the objects of the invention are realized by method and apparatus for determining a backscatter radiation component of a ring laser. In accordance with the invention there is provided electro-optic apparatus for providing to a ring laser resonant cavity, during a first interval of time, a clockwise propagating radiation beam and for providing, during a second interval of time, a counter-clockwise propagating radiation beam. There is also provided electro-optic apparatus for measuring, during the first interval of time, a magnitude of a backscatter radiation component resulting from the clockwise propagating radiation beam and for measuring, during the second interval of time, a magnitude of a backscatter radiation component resulting from the counter-clockwise propagating radiation beam. The measured backscatter magnitudes are input to a processor for calculating a lock-in characteristic, specifically a lock-in rate, of the ring laser gyroscope. The measured backscatter magnitudes are also optionally input to a display device for displaying, in conjunction with signals expressive of the clockwise and counter-clockwise propagating beams, a relationship between a beam and its resulting backscatter component.

The invention also encompasses a method of determining a lock-in characteristic of a ring laser gyroscope. The ring laser gyroscope is of the type that has an optical cavity for defining an optical path bounded by a plurality of mirrors. A first step is accomplished during a first interval of time and introduces a clockwise propagating radiation beam into the optical cavity. A second step measures a magnitude of a first backscatter radiation component resulting from the propagation of the clockwise propagating radiation beam. A third step is accomplished during a second interval of time and introduces a counter-clockwise propagating radiation beam into the optical cavity. A fourth step measures a magnitude of a second backscatter radiation component resulting from the propagation of the counter-clockwise propagating radiation beam. A fifth step determines a lock-in characteristic of the ring laser gyroscope from the measured magnitudes of the first and the second backscatter radiation components. Each of the steps of measuring includes a step of varying a length of the optical path to achieve greater than one mode of optical path difference within the cavity.

Another step of the method operates an optical chopper wheel having apertures positioned for providing during the first interval of time the clockwise propagating radiation beam and for providing during the second interval of time the counter-clockwise rotating radiation beam.

A further step of the method displays during the first interval of time a relationship of the clockwise propagating radiation beam to the resulting backscatter radiation component and displays during the second interval of time a relationship of the counter-clockwise propagating radiation beam to the resulting backscatter radiation component.

BRIEF DESCRIPTION OF THE DRAWING

The above set forth and other features of the invention are made more apparent in the ensuing Detailed Description of a Preferred Embodiment of the Invention when read in conjunction with the attached Drawing, wherein.

DETAILED DESCRIPTION OF A PREFERRED EMBODIMENT OF THE INVENTION

Figure 1:
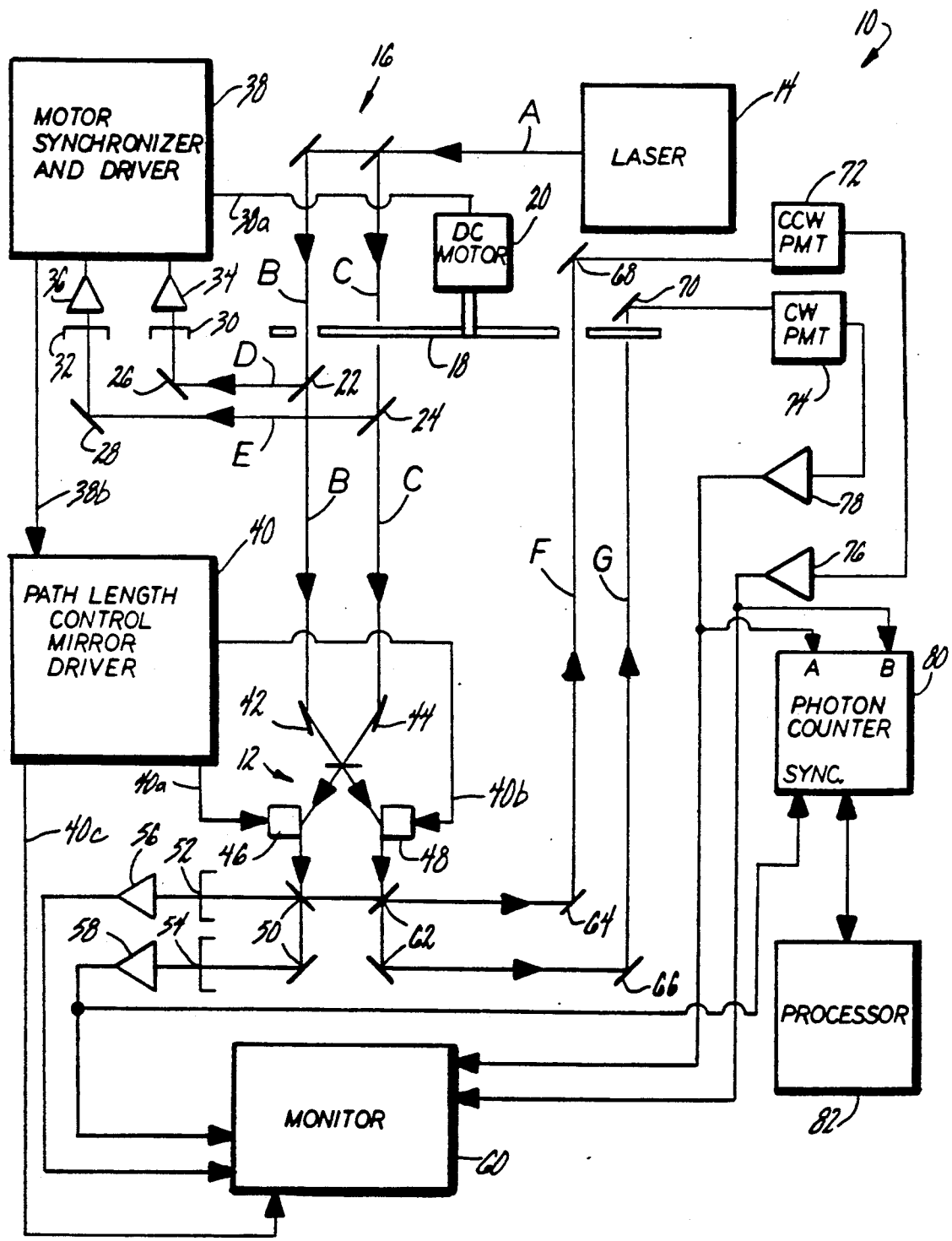
FIG. 1 illustrates in block diagram form an electro-optic system that measures and quantifies mirror backscatter for counter-propagating beams in a RLG cavity.

Referring to FIG. 1 there is illustrated an electro-optic system 10 that measures and quantifies the mirror backscatter for counter-propagating beams in a RLG cavity 12.

A laser beam designated "A" from a HeNe laser 14 is split into two substantially equal intensity beams, designated "B" and "C", by a 50% beam splitter 16. Beams B and C pass through a chopper wheel 18 that is rotated by a DC motor 20. The chopper wheel 18 alternately allows one beam, then the other, to propagate down a beam path. Relatively small portions, designated "D" and "E", of beams B and C, respectively, are picked off by 4% beamsplitters 22 and 24. Beams D and E are provided by mirrors 26 and 28 to detectors 30 and 32 and thence to amplifiers 34 and 36, respectively. Signals from amplifiers 34 and 36 are input to a motor synchronizer circuit 38 that has a first output 38a for controlling the speed of motor 20 and a second output 38b that provides a synchronization signal to a Path Length Control (PLC) mirror driver 40.

The two laser beams B and C continue through the beamsplitters 22 and 24 to mirrors 42 and 44, respectively. Mirrors 42 and 44 align the incoming clockwise (CW) and counter-clockwise (CCW) beams to the RLG 12 optical cavity. Sinusoidal signal outputs 40a and 40b from the PLC mirror driver 40 drives the RLG 12 PLC mirrors 46 and 48 through a sufficient deflection to achieve more than one mode of optical path difference in the RLG 12 optical cavity. The CW and CCW beams resonate in the optical cavity at least once every sinusoidal cycle of the PLC mirror driver 40.

When resonance occurs in the RLG 12 optical cavity a forward beam, that is a beam propagating in the direction of the inputted beam, is emitted through one of the RLG mirrors 50 and strikes an associated detector 52 or 54, depending on whether the beam is travelling CW or CCW. The detector 52 and 54 outputs are each coupled to an associated amplifier 56 and 58, respectively. The electrical signals output from the amplifiers 56 and 58 are input to two channels of a four channel signal monitor, such as an oscilloscope 60. The oscilloscope 60 is operated in an X vs. Y mode. The Y axis signal for the oscilloscope 60 is derived from a third output 40c from the PLC mirror driver 40.

When resonance alternately occurs for the CW and CCW forward beams in the RLG 12 optical cavity, backward going (or backscatter) beams are also generated.

The backscatter beams are substantially the same as the forward beams except they are between six to ten orders of magnitude less intense. The backscatter beams are generated from the backscatter that occurs at each of the mirrors 46 and 48 as the forward beam propagates around the cavity. The scatter from each mirror coherently adds as the forward beam increases or decreases in power to form a counter propagating beam proportional to the forward beam. A portion of the backscatter beam is emitted out of mirror 62 and is directed by the mirrors 64 and 66 through the chopper wheel 18 as the beams F and G. The apertures in the chopper wheel 18 are arranged so that when the forward beam is allowed to pass in the CW direction, the backscatter beam from the CCW direction is the only beam allowed through the chopper wheel 18. Alternately, when the CCW forward beam is allowed through the CW backscatter beam also passes through the chopper wheel 18. This arrangement prevents either of the relatively much higher power CW or CCW forward beams from reflecting from mirrors 68 or 70 and impinging on photomultiplier tubes (PMT) 72 and 74. Instead, only the much less intense backscatter beams are directed to the PMTs 72 and 74 where the signal intensity of the backscatter beam is measured.

An electrical signal output from each of the PMTs 72 and 74 is input to an associated amplifier 76 and 78, respectively, and thence to an input channel of a photon counter 80 and also to vertical channels of the oscilloscope 60. A processor 82 is coupled to the counter 80 and records the data output thereby.

In accordance with the invention the output data from the photon counter 80 is employed by the processor 82 to calculate the power of the backscatter beam, from which the lock-in rate of the RLG 12 can be calculated, as is described below.

The oscilloscope 60 is optional and is primarily used to obtain a qualitative indication of the RLG characteristics. The four channels of the oscilloscope 60 display the two forward beams and the two backscatter beams. Movement of any of the mirrors, such as 46 and 48, within the RLG 12 cavity may change the lock-in value of the RLG. Thus, by monitoring the backscatter trace and its corresponding forward beam trace an operator of the system 10 can readily observe the magnitude of the backscatter and determine if the backscatter magnitude is acceptable for a given mirror position.

The invention also encompasses a method of determining a lock-in characteristic of the RLG 12, the RLG being of the type that has an optical cavity for defining an optical path bounded by a plurality of mirrors. A first step is accomplished during a first interval of time and introduces the CW propagating radiation beam into the optical cavity. A second step measures a magnitude of the first backscatter radiation component resulting from the propagation of the CW propagating radiation beam. A third step is accomplished during a second interval of time and introduces the CCW propagating radiation beam into the optical cavity. A fourth step measures a magnitude of a second backscatter radiation component resulting from the propagation of the CCW propagating radiation beam. A fifth step determines a lock-in characteristic of the RLG from the measured magnitudes of the first and the second backscatter radiation components. Each of the steps of measuring includes a step of varying a length of the optical path to achieve greater than one mode of optical path difference within the cavity.

Another step of the method operates the optical chopper wheel having apertures positioned for passing during the first interval of time the CW propagating radiation beam to the optical cavity while passing the resulting backscatter radiation component to a CW beam measuring device and for passing during the second interval of time the CCW rotating radiation beam to the optical cavity while passing the resulting backscatter radiation component to a CCW beam measuring device. A further optional step of the method displays during the first interval of time a relationship of the clockwise propagating radiation beam to the resulting backscatter radiation component and displays during the second interval of time a relationship of the counterclockwise propagating radiation beam to the resulting backscatter radiation component.

It can be seen that the teaching of the invention permits the RLG 12 cavity mirror quality to be determined prior to the pump and fill process. Furthermore, the teaching of the invention provides method and apparatus to directly measure and quantify the magnitude of the backscatter within the RLG 12 cavity such that processor 82 is enabled to accurately predict the lock-in characteristics of the RLG 12.

Figure 2:
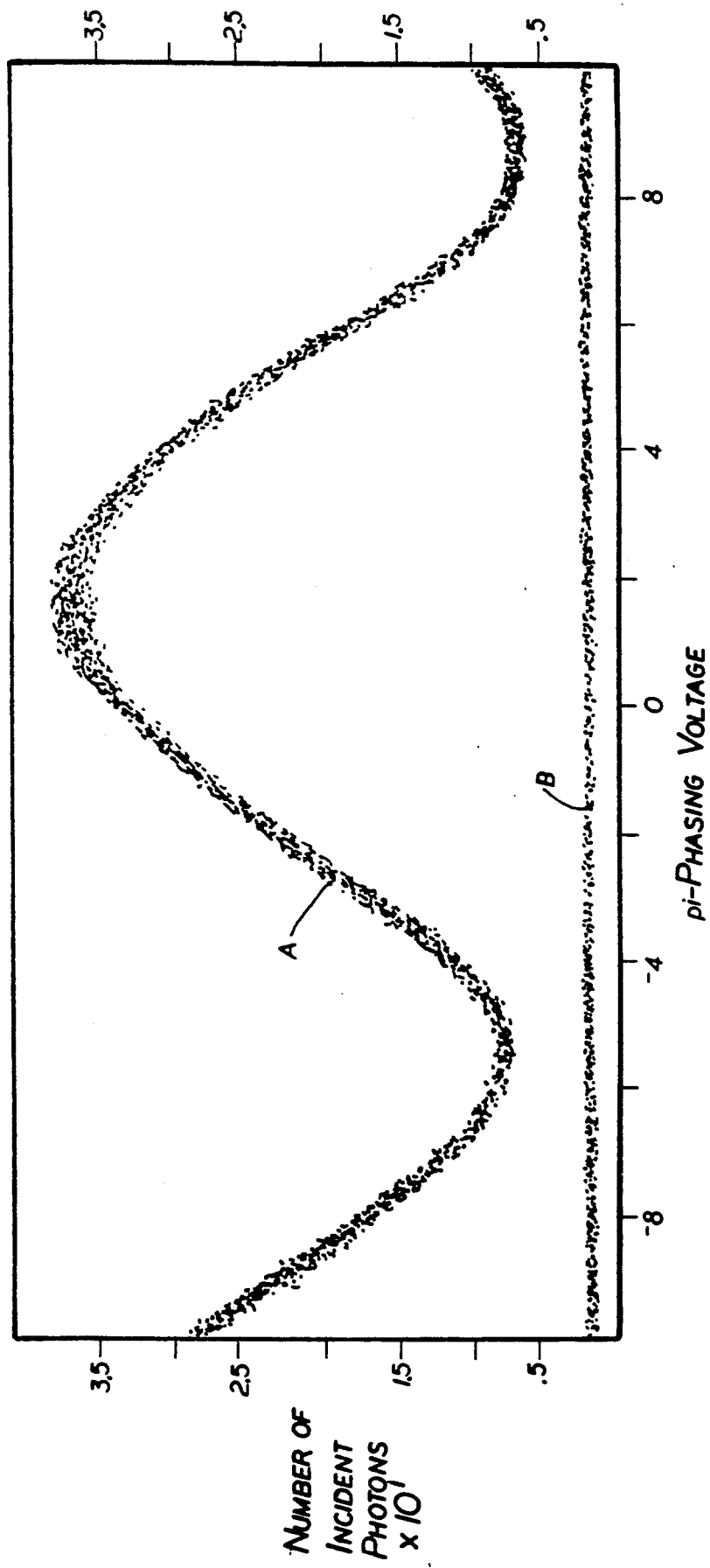
FIG. 2 is a plot of a number of photons counted as the RLG passes through resonance.

Reference is now made to the graph of FIG. 2 in conjunction with the mathematical expressions given below. FIG. 2 is plotted for a beam propagating in the clockwise direction. A similar plot would be generated for the counter-clockwise direction. In FIG. 2 each plotted point represents the integration of 1000 samples.

As used in the equation, the following terms are defined:

$\Omega_L$ = RLG lock-in rate,
$I_1$ = power of the backscatter beam,
$I_2$ = power of the forward propagating beam,
$\alpha$ = a measured optical cavity loss,
c = speed of light,
SF = scale factor of the ring laser gyroscope; and
L = length of the optical cavity.

$I_1$ may be obtained from the plot of FIG. 2. Specifically, multiply the number of photons per unit of time of the photon counter window [$\mu s$] by the energy per photon. Next, divide the result by the window time (10 $\mu s$). This results in a power (Watts). Next, divide by the transmission of the output mirror to obtain the total backscatter power. For example, if the output mirror is 10% transmissive the power is divided by 0.1.

To obtain $I_2$ multiply the peak power detected by the photodiode (52 or 54) by the scale factor. Next, divide this result by the transmission of the associated mirror.

The total optical cavity loss is determined in accordance with conventional practice, such as by determining the cavity finesse and calculating loss therefrom.

The lock-in rate of the RLG 12 is determined in accordance with the following equation.

$$\Omega_L = \sqrt{\frac{I_1}{I_2}} \; \frac{\alpha c}{2\sqrt{2} \; \pi SF \times L} \quad \text{(steady state)}$$

FIG. 2 illustrates two curves, specifically, a sinusoidal Backscatter Curve (A) and a "Dark Curve" (B). The Backscatter Curve (A) is a plot of the number of photons counted in the 10 $\mu s$ window as the RLG passes through resonance. The horizontal axis is represents the pi-phasing voltage that is applied to the PLC mirrors 46 and 48. This voltage, causes one of the mirrors to be "pulled out" and the other mirror to be "pushed in", thereby dithering the path length. The total distance traveled by both mirrors is equal. As a result, the overall path length of the RLG remains constant however one leg of the RLG experiences a path length change of one wavelength. The change in the relative position between those two mirrors causes constructive and destructive interference to occur. The RLG 12 preferably is operated with the lowest lock-in, that is, at the minimum of the curve (A).

The Dark Curve (B) indicates the number of photons counted by the photon counter when no light is incident on the detector from a laser resonance. This is primarily due to PMT dark current and stray light and has no dependence on the pi-phasing voltage. The value used in the calculation is the difference between the curve (A) and the curve (B).

While the invention has been particularly shown and described with respect to a preferred embodiment thereof, it will be understood by those skilled in the art that changes in form and details may be made therein without departing from the scope and spirit of the invention.

What is claimed is:

1. Apparatus for determining a magnitude of a backscatter radiation component of a ring laser comprising:
    means for providing to a ring laser resonant cavity during a first interval of time a clockwise propagating radiation beam and during a second interval of time a counter-clockwise propagating radiation beam, the cavity including a plurality of mirror means for reflecting the beams within the cavity; and
    means for measuring during the first interval of time a magnitude of a backscatter radiation component resulting from the clockwise propagating radiation beam and for measuring during the second interval of time a magnitude of a backscatter radiation component resulting from the counter-clockwise propagating radiation beam.

2. Apparatus as set forth in claim 1 wherein the providing means is comprised of:
    laser means for providing a primary radiation beam;
    beamsplitter means for splitting the primary radiation beam into a first radiation beam and into a second radiation beam;
    chopper means for passing during the first interval of time the first radiation beam and for passing during the second interval of time the second radiation beam; and
    mirror means being disposed relative to the ring laser cavity for reflecting the first radiation beam into the ring laser cavity in the clockwise propagating direction and for reflecting the second radiation beam into the ring laser cavity in the counter-clockwise propagating direction.

3. Apparatus as set forth in claim 2 wherein the chopper means includes a DC motor having a chopper wheel rotatably coupled thereto and a DC motor driver means for driving the DC motor.

4. Apparatus as set forth in claim 1 and further comprising ring laser cavity optical path length control means having outputs coupled to the mirror means for driving each of the mirror means through a sufficient deflection to achieve greater than one mode of optical path difference within the cavity.

5. Apparatus as set forth in claim 1 wherein the measuring means includes a first optical detector means for detecting the magnitude of the backscatter radiation component resulting from the clockwise propagating radiation beam and a second optical detector means for detecting the magnitude of the backscatter radiation component resulting from the counter-clockwise propagating radiation beam.

6. Apparatus as set forth in claim 5 wherein each of the detector means is comprised of a photomultiplier tube having an output coupled to photon counter means.

7. Apparatus as set forth in claim 2 wherein the measuring means includes a first optical detector means for detecting the magnitude of the backscatter radiation component resulting from the clockwise propagating radiation beam and a second optical detector means for detecting the magnitude of the backscatter radiation component resulting from the counter-clockwise propagating radiation beam and wherein the chopper means further passes to the first optical detector means during the first interval of time the backscatter radiation component resulting from the clockwise propagating beam and passes to the second optical detector means during the second interval of time the backscatter radiation component resulting from the counter-clockwise propagating radiation beam.

8. Apparatus as set forth in claim 1 and further comprising display means for displaying during the first time interval a relationship of the clockwise propagating radiation beam to the resulting backscatter radiation component and for displaying during the second time interval a relationship of the counter-clockwise propagating radiation beam to the resulting backscatter radiation component.

9. A method of determining a lock-in characteristic of a ring laser gyroscope of the type having an optical cavity for defining an optical path bounded by a plurality of mirrors, the method comprising the steps of:

during a first interval of time introducing a clockwise propagating radiation beam into the optical cavity;
measuring a magnitude of a first backscatter radiation component resulting from the propagation of the clockwise propagating radiation beam;
during a second interval of time introducing a counter-clockwise propagating radiation beam into the optical cavity;
measuring a magnitude of a second backscatter radiation component resulting from the propagation of the counter-clockwise propagating radiation beam; and
determining a lock-in characteristic of the ring laser gyroscope from the measured magnitudes of the first and the second backscatter radiation components.

10. The method of claim 9 and including a step of operating an optical chopper wheel having apertures positioned for providing during the first interval of time the clockwise propagating radiation beam and for providing during the second interval of time the counter-clockwise rotating radiation beam.

11. The method of claim 9 wherein the steps of measuring each include a step of providing the backscatter radiation component to an associated radiation detector means.

12. The method of claim 9 and further including a step of displaying during the first interval of time a relationship of the clockwise propagating radiation beam to the resulting backscatter radiation component and a step of displaying during the second interval of time a relationship of the counter-clockwise propagating radiation beam to the resulting backscatter radiation component.

13. The method of claim 9 wherein each of the steps of measuring include a step of varying a length of the optical path to achieve greater than one mode of optical path difference within the cavity.

14. The method of claim 9 wherein the step of determining is accomplished in accordance with the expression $$\Omega_L = \sqrt{\frac{I_1}{I_2}} \frac{\alpha c}{2\sqrt{2}\ \pi SF \times L} \text{ (steady state)}$$

wherein:

$\Omega_L$ = RLG lock-in rate,
$I_1$ = power of the backscatter beam,
$I_2$ = power of a forward propagating beam,
$\alpha$ = optical cavity loss,
$c$ = speed of light,
SF = scale factor of the ring laser gyroscope; and
L = length of the optical cavity.

15. Apparatus for determining a lock-in characteristic of a ring laser gyroscope of the type having an optical cavity for defining an optical path bounded by a plurality of mirrors, comprising:

first means for introducing during a first interval of time a clockwise propagating radiation beam into the optical cavity;
first means for measuring a magnitude of a first backscatter radiation component resulting from the propagation of the clockwise propagating radiation beam;
second means for introducing during a second interval of time a counter-clockwise propagating radiation beam into the optical cavity;
second means for measuring a magnitude of a second backscatter radiation component resulting from the propagation of the counter-clockwise propagating radiation beam; and
means for determining a lock-in characteristic of the ring laser gyroscope from the measured magnitudes of the first and the second backscatter radiation components.

16. Apparatus as set forth in claim 15 and further comprising an optical chopper wheel having apertures positioned for passing during the first interval of time the clockwise propagating radiation beam to the optical cavity while passing the resulting backscatter radiation component to the first measuring means and for passing during the second interval of time the counter-clockwise rotating radiation beam to the optical cavity while passing the resulting backscatter radiation component to the second measuring means.

17. Apparatus as set forth in claim 15 and further comprising means for displaying during the first interval of time a relationship of the clockwise propagating radiation beam to the resulting backscatter radiation component and for displaying during the second interval of time a relationship of the counter-clockwise propagating radiation beam to the resulting backscatter radiation component.

18. Apparatus as set forth in claim 15 and further comprising means for varying a length of the optical path to achieve greater than one mode of optical path difference within the optical cavity.

19. Apparatus as set forth in claim 15 wherein the determining means includes means for determining a lock-in rate of ring laser gyroscope in accordance with the expression $$\Omega_L = \sqrt{\frac{I_1}{I_2}} \frac{\alpha c}{2\sqrt{2}\ \pi SF \times L} \text{ (steady state)}$$

wherein:

$\Omega_L$ = RLG lock-in rate,
$I_1$ = power of the backscatter beam,
$I_2$ = power of a forward propagating beam,
$\alpha$ = optical cavity loss,
$c$ = speed of light,
SF = scale factor of the ring laser gyroscope; and
L = length of the optical cavity.

* * * * *